(12) United States Patent
Unterdörfer et al.

(10) Patent No.: US 8,343,648 B2
(45) Date of Patent: Jan. 1, 2013

(54) POWER STORAGE CELL WITH HEAT CONDUCTING PLATE

(75) Inventors: Jens Unterdörfer, Berlin (DE); Peter Birke, Glinicke/Nordbahn (DE); Swen Wiethoff, Berlin (DE); Reinhard Kassen, Berlin (DE); Nevzat Güner, Berlin (DE); Stefan Tillmann, Berlin (DE); Markjus Schweizer-Berberich, Berlin (DE); Michael Keller, Baden-Baden (DE)

(73) Assignee: Temic Automotive Electric Motors GmbH (DE)

( * ) Notice: Subject to any disclaimer, the term of this patent is extended or adjusted under 35 U.S.C. 154(b) by 513 days.

(21) Appl. No.: 12/529,753

(22) PCT Filed: Mar. 5, 2008

(86) PCT No.: PCT/DE2008/000376
§ 371 (c)(1),
(2), (4) Date: Dec. 4, 2009

(87) PCT Pub. No.: WO2008/106946
PCT Pub. Date: Sep. 12, 2008

(65) Prior Publication Data
US 2010/0104937 A1    Apr. 29, 2010

(30) Foreign Application Priority Data

Mar. 5, 2007 (DE) .......... 10 2007 011 862
Apr. 27, 2007 (DE) .......... 10 2007 020 464
Sep. 24, 2007 (DE) .......... 10 2007 045 718

(51) Int. Cl.
H01M 10/50 (2006.01)
(52) U.S. Cl. ......... 429/120; 429/135; 429/136; 429/138
(58) Field of Classification Search .......... 429/120, 429/176, 135, 136, 138, 149, 126
See application file for complete search history.

(56) References Cited

U.S. PATENT DOCUMENTS

| | | | |
|---|---|---|---|
| 2002/0061436 A1* | 5/2002 | Inagaki et al. | 429/120 |
| 2003/0013009 A1* | 1/2003 | Dansui et al. | 429/120 |
| 2004/0142238 A1* | 7/2004 | Asahina et al. | 429/176 |
| 2006/0216582 A1* | 9/2006 | Lee et al. | 429/120 |

FOREIGN PATENT DOCUMENTS

| | | |
|---|---|---|
| EP | 0 588 004 A1 | 7/1993 |
| EP | 1 143 541 A1 | 10/2001 |
| JP | 63-98971 | 4/1988 |
| WO | WO 2006/101342 A1 | 9/2006 |

* cited by examiner

Primary Examiner — Patrick Ryan
Assistant Examiner — Ben Lewis
(74) Attorney, Agent, or Firm — RatnerPrestia

(57) ABSTRACT

An energy storage cell having a flexible envelope, which cell is attached flat to a heat-conducting plate.

12 Claims, 4 Drawing Sheets

POWER STORAGE CELL WITH HEAT CONDUCTING PLATE

CROSS REFERENCE TO RELATED APPLICATIONS

This application is the U.S. national phase application of PCT International Application No. PCT/DE2008/000376, filed Mar. 5, 2008, which claims priority to German Patent Application No. DE 10 2007 011 862.9, filed Mar. 5, 2007, German Patent Application No. DE 10 2007 020 464.9, filed Apr. 27, 2007, and German Patent Application No. DE 10 2007 045 718.0, filed Sep. 24, 2007, the contents of such applications being incorporated by reference herein.

BACKGROUND OF THE INVENTION

1. Field of the Invention

The invention refers to an energy storage cell which is used in energy stores, especially in hybrid or electric vehicles.

Hybrid or electric vehicles are vehicles which, in principle, are driven partly or completely by electrical energy.

2. Description of the Related Art

Motor vehicles with a hybrid drive, which are also called hybrid vehicles, have for example an internal combustion engine, an electric machine and one or several electrochemical energy stores. Electric vehicles having fuel cells generally consist of a fuel cell for energy conversion, a tank for liquid or gaseous energy carriers, an electrochemical energy store, and an electric machine for drive purposes.

The electric machine of the hybrid vehicle is, as a rule, designed as a starter/generator and/or an electric drive. In the case of a starter/generator, it replaces the starter and the generator which are normally provided. If designed as an electric drive, the electric machine can provide an additional torque, i.e. an accelerating torque, in order to drive the vehicle forward. As a generator, it enables braking energy and the on-board power network supply to be recuperated.

In a solely electric vehicle, the driving power is provided by an electric machine alone. Both vehicle types, hybrid and electric vehicles, have in common that large amounts of electrical energy have to be provided and transferred.

The flow of energy is controlled by means of electronics which are generally called hybrid controller. It controls, among other things, whether and to which extent energy is to be drawn from or supplied to the energy store.

The energy drawn from the fuel cell or the energy store generally serves to provide driving power and to supply the vehicle's on-board power network. Said energy supply serves to charge the store or to convert braking energy into electrical energy, i.e. regenerative braking.

The energy store for hybrid applications can be recharged while driving. The energy required for this purpose is provided by the internal combustion engine.

The energy suppliers and stores used for electric vehicle applications include for example lead batteries, double-layer capacitors, nickel metal hydride cells or lithium ion cells.

The energy storage cell is accommodated in a gas-tight metal housing in most cases. A special possibility to design lithium ion cells is in the form of a soft pack. This consists of the battery cell which is enclosed by a flexible envelope, typically an aluminium composite film packaging. Due to the geometric similarity with a straight prism, such energy storage cells are also called prismatic energy storage cells.

An important requirement made of these energy stores is to find an optimum of the product of voltage and current for a required power output. This optimization procedure takes into account material and cost aspects. It is found that neither a system designed for high voltages nor one designed for high currents is appropriate for the intended field of application.

Typical voltage ranges for optimum system design are between 100 V and 450 V maximum voltage; the resulting currents can reach 400 A in pulsed operation or even 550 A for special extreme applications and for higher temperature ranges. Continuous currents are in the range of 80-100 A, but they can also be higher, depending on the application. Due to structural and cost reasons, a reduction of these currents in favour of higher voltages involves much more effort than a consistent system design for these high currents.

These requirements do not just apply to energy stores for automotive applications, such as hybrid or electric vehicles, but also in the stationary sector, e.g. for buffering peak loads or in energy stores for decentralized power supply.

Depending on the application as an energy store for hybrid vehicles, plug-in hybrids or as an electric vehicle, maximum power outputs of 10 kW to more than 100 kW are required. Although the requirements made of continuous power outputs can be considerably below these values, such continuous power outputs involve particularly high cooling requirements, especially since the installation space for energy stores is, as a rule, quite limited.

Due to the structure of such high-performance cells (typically >4 Ah), their costs are considerably higher than those of simple consumer cells which, as a rule, also have lower capacities. In addition, the automobile industry requires a service life of more than 10 years.

In order to meet this service life requirement, an efficient cooling concept is indispensable.

WO2007/068223-A1 describes a battery holder with integrated cooling, especially for receiving cylindrical galvanic cells, as they are commonly used in hybrid vehicles, in which battery holder the energy stores are arranged in a honeycomb structure and are cooled by means of two basic heat sinks and at least one intermediate heat sink.

In terms of service life, however, it is not only important that the cell be cooled (absolute cooling), but that it is cooled evenly (relative cooling), i.e. with the lowest possible temperature gradient across the cell and, if several cells are connected to form an energy store, across this energy store, i.e. across the cells. The aim is a temperature difference of $\Delta T<3$ K, $\Delta T<5$ K already being a good value.

Despite an even flow of coolant across or through the entire store, individual cell segments can heat up to a different degree.

In particular those cells which are connected in parallel are not necessarily coupled thermally although they are coupled electrically. Thermal coupling is important, however, to ensure an even flow of current under load. As a rule, it can be assumed that an increase in temperature by 15 K doubles kinetics. Different currents flowing within a parallel circuit in the case of load can accelerate aging of local areas and even cause damage in the case of high currents.

SUMMARY OF THE INVENTION

An object of the present invention is to ensure an even temperature of an energy storage cell having a flexible envelope.

This object is achieved by means of an energy storage cell. Due to their geometry and their inner structure, prismatic cells have the advantage that the cell has a high thermal conductivity in the direction of its metallic lead electrodes.

The thermal conductivity of the cell in the direction perpendicular thereto is considerably lower due to the insulating properties of the separator layers.

The lower thermal conductivity of the cell perpendicular to the separator layers is compensated by attaching an energy storage cell flat to a heat-conducting plate. The energy storage cell is cooled and/or heated effectively via its surface.

This concept has the major advantage that benefit is made of the good inherent thermal conductivity of the energy storage cell in the direction of the electrodes and the current leads.

The advantage of the concept is that the surface of a cell is attached in a potential-free manner to a heat-conducting plate at the shortest possible distance. Simulation results show that values of $\Delta T<5$ K can already be achieved with thicknesses of the heat-conducting plates of 1 mm, provided the cells have an adequate geometry. The cooling and/or heating achieved is thus very effective since the energy storage cells and the heat-conducting plate are in direct contact. Both indirect air cooling and liquid cooling are possible. In this way, an energy store can be optimally cooled and particularly high service life expectations can be met.

Other advantages of the invention are the compact, reliable and cost-effective structure of energy storage cells which are used in an energy store. The energy storage cells can be used as part of a modular system (high degree of modularity).

Electrical insulation between the heat-conducting plate and the interior of the energy storage cell is already provided by the outer insulation (nylon) and the inner insulation (polypropylene) of the flexible envelope in a typical soft pack cell.

The one-sided attachment to the heat-conducting plate enables the energy storage cell to "breathe". "Breathing" refers to changes in volume which occur during normal operation. This is because the energy storage cell is not sandwiched in a rigid manner, but is left enough space for breathing on the side facing away from the heat-conducting plate. Volume changes are the result of e.g. lithium ions, in the case of lithium ion cells, being inserted into and removed from the host lattice. If misused (overheating, overload), the cell can also develop gases before these are released from the cell due to the higher increase in temperature and pressure. This possibility is regarded an essential safety feature in order to avoid a sudden pressure relieve or undesirable side reactions.

Jointly with the energy storage cells having a flexible envelope, the heat-conducting plates enable fixed measures and fixing points to be introduced and observed (snapping-in or attachment of the heat-conducting plates on a temperature adjustment unit). In the case of stacking, the unfavourable addition of manufacturing tolerances of the energy storage cells having a flexible envelope is therefore avoided.

In this way, a compact, simple, reliable and cost-effective structure is obtained which can be used as part of a modular system (high degree of modularity). Effective cooling and/or heating is possible by means of temperature adjustment via air or liquid.

Identical energy storage cells with heat-conducting plates can be used for different cooling and/or heating concepts (air or liquid cooling and/or heating). This offers a number of saving potentials (due to reduced amounts, but also to the reduction of the number of different components), especially for an offer of systems with modular structure which can then be equipped with identical energy storage cells with heat-conducting plates.

In an advantageous embodiment, the heat-conducting plate which is attached to an energy storage cell having a flexible envelope is thermally coupled to a temperature adjustment device. The temperature adjustment device serves to cool and/or heat the energy storage cell.

Preferably, the heat-conducting plate is thermally coupled to the temperature adjustment device by fixing one end of the heat-conducting plate within the temperature adjustment device. Possible ways of fixing are screwing, clamping, crimping, wedging, gluing, riveting and/or pressing. Pressing is done by means of an outer frame, for example. Wedging is a particularly preferred possibility of fixing; the wedges can be secured by means of sheaths and screws. This way of fixing enables particularly good heat transfer while being highly resistant to vibrations.

The temperature adjustment device advantageously comprises air and/or liquid cooling and/or heating. The temperature adjustment device can additionally or exclusively be arranged laterally. Several temperature adjustment devices on different sides are also conceivable in order to achieve a particularly low temperature gradient.

The thermal connection of the battery to an external temperature adjustment device can also be used for heating the system in a targeted fashion if ambient temperatures are particularly low in order to ensure that the cell temperature is as uniform as possible in this case too. Here, the advantage is that the cells are pre-heated to a suitable operation temperature, e.g. before starting the motor in winter.

In another advantageous embodiment, prismatic energy storage cells having a flexible envelope are glued preferably to one side of a heat-conducting plate according to the invention.

The adhesive can be provided in liquid form or as a heat-conducting foil. The adhesive fulfils the task to ensure good heat transfer, provide an additional electrical insulation (increase the dielectric rigidity) and fix the cell for further assembly.

In a particular further development, the cooling by means of a temperature adjustment device can be improved even further by attaching the energy storage cell to the heat-conducting plate in a non-homogeneous manner, for example by means of a triangular geometry of the adhesive zone, so that less heat is removed near the cooler than in the more distant area, i.e. the heat distribution or the heat gradient within the energy storage cell is compensated.

The energy storage cell is preferably attached to the heat-conducting plate by means of an adhesive joint via the cell body. However, the attachment can also be realized by means of mechanical pressure or a holder on the edge of the cell. The cell's edge can be glued, clamped, screwed, riveted or nailed.

The heat-conducting plate can advantageously be used as a structural element to attach the energy storage cell within a frame structure.

The heat-conducting plate can advantageously also be shaped as a structural element of the cell body itself. For this purpose, the cell is placed flat on the cooling plate and a cover structure is pressed, glued or welded thereto on both sides.

It is preferred that the heat-conducting plates be made of metal, particularly preferred of aluminium, and made more rigid by alloying and/or micro-ribbing their surface.

In another advantageous embodiment, several cells ("multi-pack"), preferably two cells ("bi-pack"), are connected to a shared heat-conducting plate. This offers optimum thermal coupling of energy storage cells in a parallel circuit. A connection in series is also possible if required by the application.

An adaptation to different cooling concepts is possible if identical bi-packs are used since changes are made only to the shared cooling plate and not on the level of the bi-packs.

In the application, a more even temperature distribution can be achieved for a bi-pack with two thinner energy storage cells than for a single energy storage cell whose thickness is twice that of one of the two cells of the bi-pack.

BRIEF DESCRIPTION OF THE DRAWINGS

Exemplary embodiments of the invention will now be explained in more detail with reference to the drawings in which.

DETAILED DESCRIPTION OF THE PREFERRED EMBODIMENTS

Figure 1:
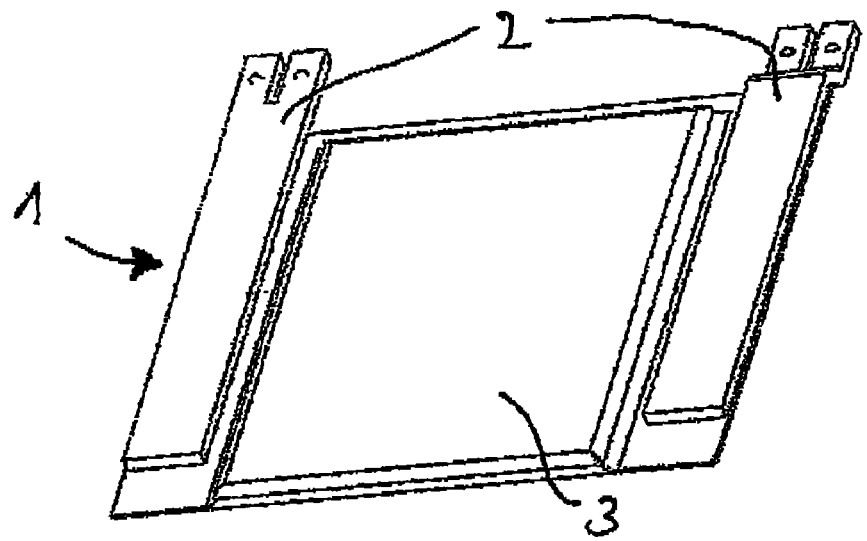
FIG. 1 shows an energy storage cell having a flexible envelope and two current leads.

The energy storage cell (1) shown in FIG. 1 is provided with a flexible envelope (3), on the welded ends thereof two metallic current leads (2) are attached. The flexible envelope (3) is welded along its circumference so as to enclose the cathode (5), separator (4) and anode layers (6), the electrolyte material and the inner cell leads. The outer metallic current leads (2) are riveted to the inner cell leads. The outer metallic current leads (2) are for example made of copper. The voltage is picked off the metallic current leads (2).

Figure 2A:
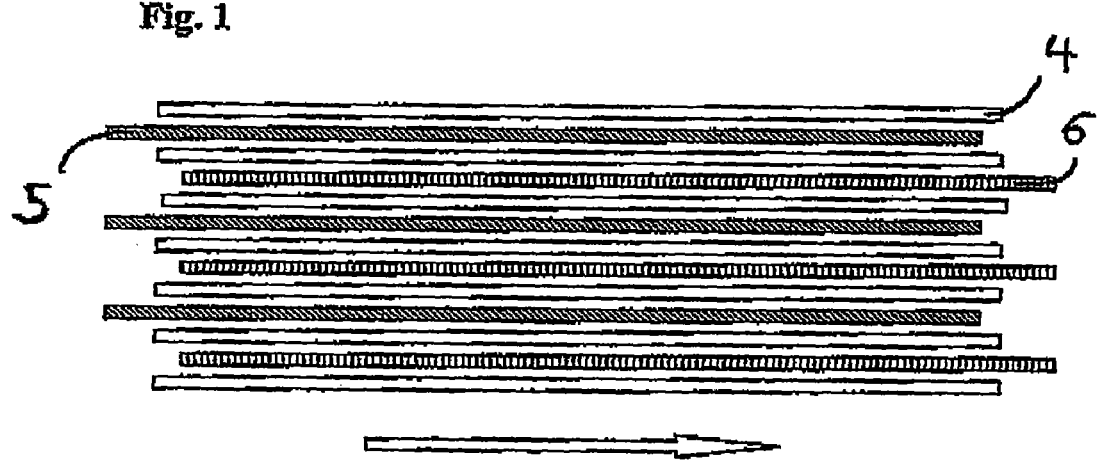
FIGS. 2a and 2b show cross-sections of the interior of an energy storage cell with the cathode, anode and separator layers.

FIG. 2a shows a cross section of the interior of an energy storage cell (1). The cathode (5) and anode layers are separated from each other by a separator layer (4) in each case. The cathode layers (5) supply the outer current lead (2) on the left-hand side via the inner current lead. This current lead (2) forms the negative pole of the cell which can be picked off.

The anode layers (6) supply the second current lead (2) on the right-hand side correspondingly. This current lead (2) forms the positive pole of the cell which can be picked off.

The arrow shows into the preferred direction of heat transfer of the cell: parallel to the planes of the cathode (5) and anode layers. The metallic current leads (2) are already a first element to adjust the temperature of the energy storage cell (1).

Figure 2B:
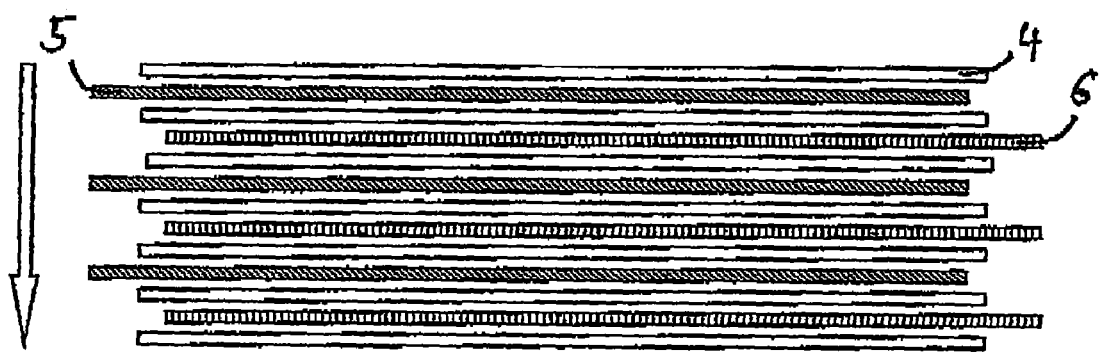

FIG. 2b shows the same cross-section of the interior of an energy storage cell (1) as FIG. 2a, except that the arrow indicates the direction in which the thermal conductivity of the energy storage cell is highly restricted. In the direction perpendicular to the planes of the cathode (5) and anode layers (6), the separator layers (4) highly restrict the flow of heat. This is because the separator (4) consists of insulating material which causes a low thermal conductivity. According to the invention, this problem is solved by attaching a heat-conducting plate (7) to one side of the energy storage cell (1). The heat-conducting plate (7) is parallel to the electrode (5, 6) and separator layers (4). According to the invention, but not shown in FIG. 2b, the flexible envelope (3) of the energy storage cell (1) would preferably be arranged below the lowest separator layer (4) and the heat-conducting plate (7) below said envelope.

Figure 3:
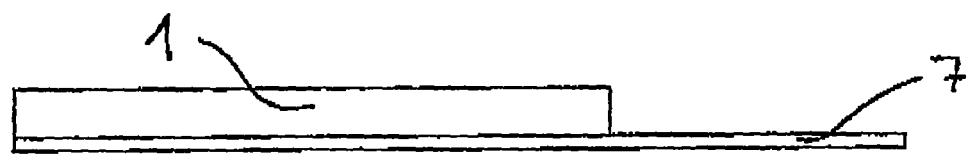
FIG. 3 shows an energy storage cell which is attached to a heat-conducting plate.

FIG. 3 shows an energy storage cell (1) having a flexible envelope (3), which cell is attached flat to a heat-conducting plate (7).

Figure 4:
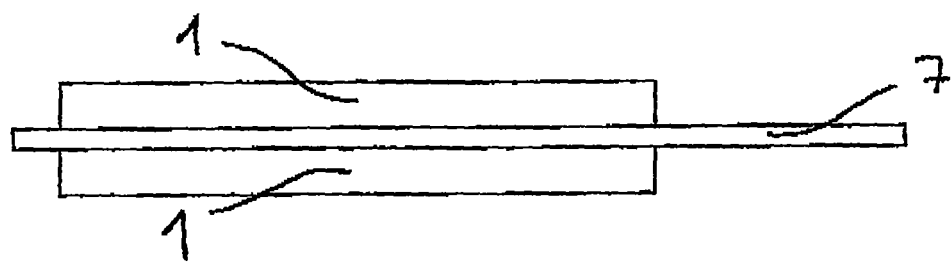
FIG. 4 shows a bi-pack.

FIG. 4 shows two energy storage cells (1) having a flexible envelope (3), each of which energy storage cells (1) is attached to one side of a shared heat-conducting plate (7). This arrangement is called bi-pack. Accordingly, more than two energy storage cells (1) are attached to one or both sides of a shared heat-conducting plate (7) in the case of a multi-pack.

Figure 5:
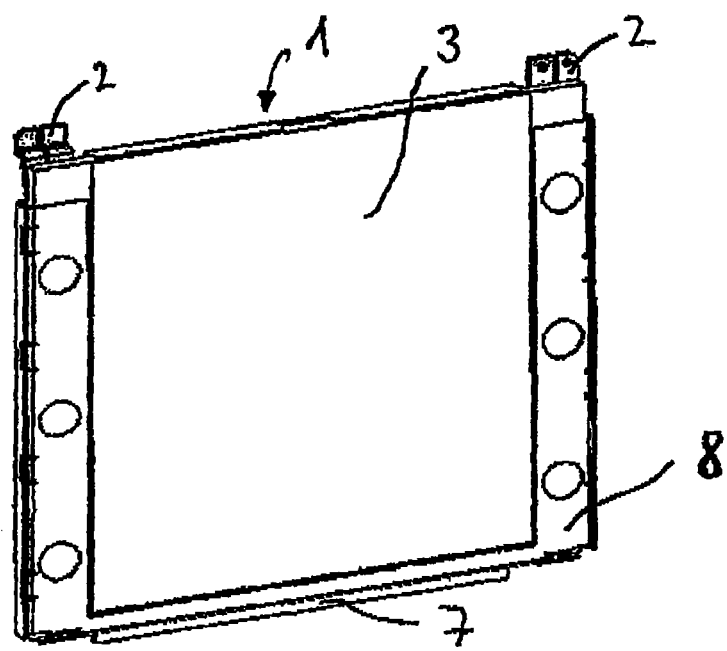
FIG. 5 shows the attachment of an energy storage cell to a heat-conducting plate having a housing.

FIG. 5 shows an energy storage cell (1) which is arranged in a housing (8) made of a material whose rigidity is higher than that of the envelope (3) of the energy storage cell (1). The housing helps to fix the energy storage cell (1) on a heat-conducting plate (7) which is also arranged within the housing (8). It is preferred that the energy storage cell (1) be in addition be glued to the heat-conducting plate (7). The energy storage cell (1) and/or the heat-conducting plate (7) can also be attached within the housing (8) by means of an adhesive device.

By arranging the energy storage cell (1) within the housing (8), the energy storage cell is stabilized mechanically.

It can be seen in the shown embodiment of the housing (8) that the flexible envelope (3) on the front side of the energy storage cell (1) passes through a window opening of the housing (8). In this way, the energy storage cell (1) arranged within the housing is enabled to "breathe".

Figure 6:
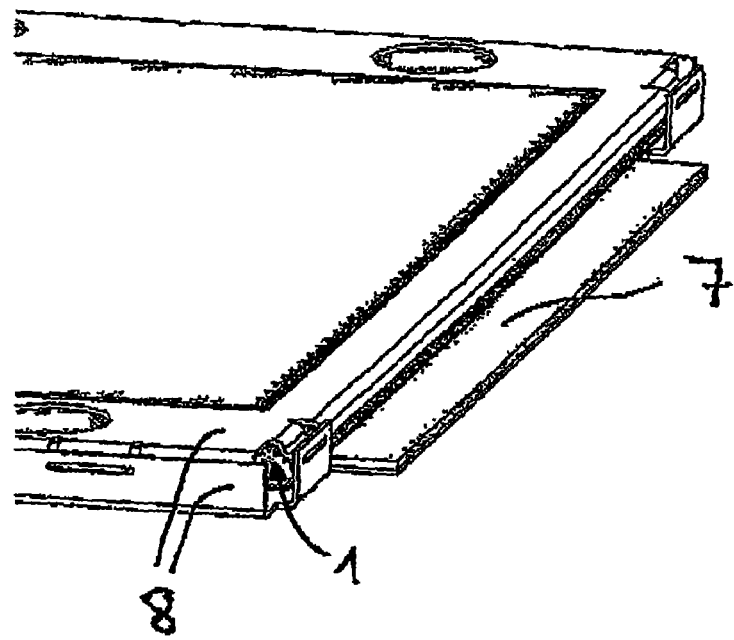
FIG. 6 shows the arrangement of the energy storage cell, heat-conducting plate and frame.

In the illustration shown in FIG. 6, the housing (8) comprises a cover having a window opening and a bottom. The cover and bottom are preferably connected by means of a hinge and can be closed by means of a snap-in hook. The heat-conducting plate (7) is arranged below the energy storage cell (1) and passes to the outside through an opening of the housing (8). Here, it can be connected to an external temperature adjustment unit.

Figure 7:
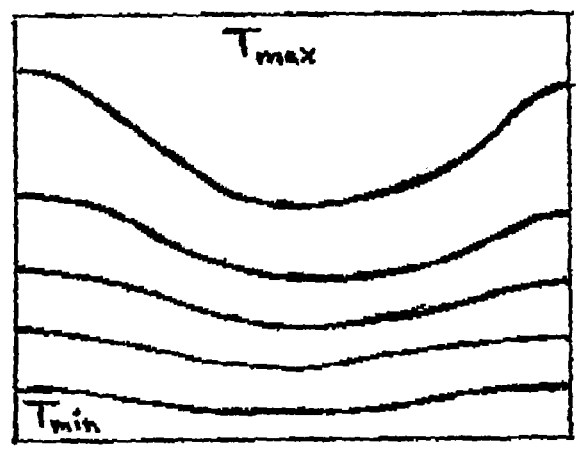
FIG. 7 shows the simulated temperature curve in an energy storage cell which is cooled by means of a heat-conducting plate.

The diagram in FIG. 7 illustrates the simulated temperature curve in an energy storage cell (1). The energy storage cell is attached flat to a heat-conducting plate (7) which is cooled from below. The metallic current leads (2) are to the left and right of the energy storage cell (1) and influence the temperature curve. The diagram shows that the temperature is lowest at the bottom since cooling is done from there. The temperature rises as one moves upwards in the energy storage cell (1). The current leads (2) bring about a stronger cooling in the left and right areas of the energy storage cell (1) compared to the central area. This is because the current leads (2) are made of metal thus serving to remove heat, as already described.

The non-homogeneity or asymmetry of the temperature curve can be counteracted in further advantageous exemplary embodiments.

Figure 8:
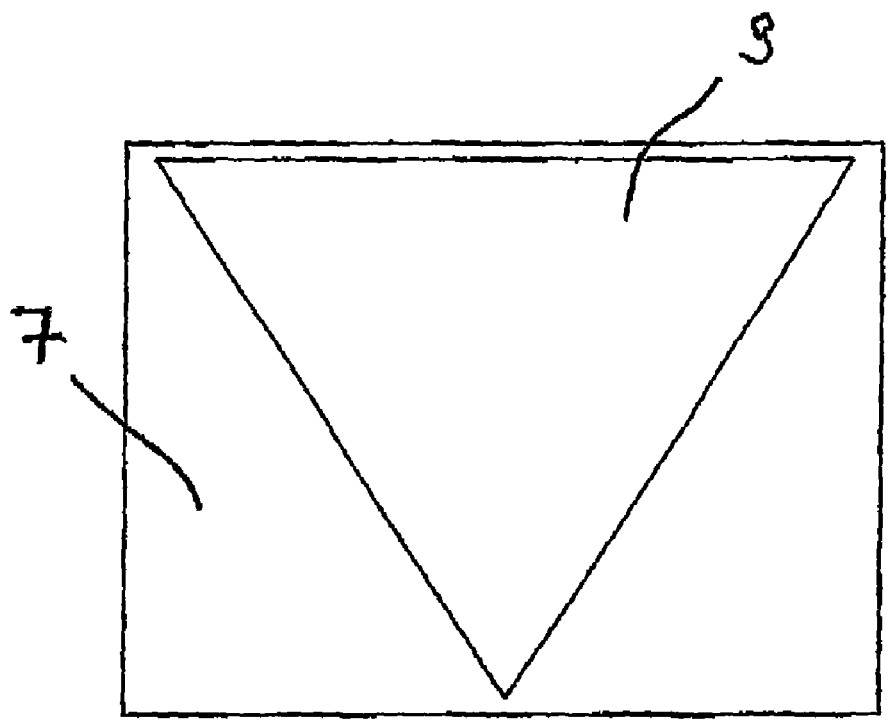
FIG. 8 shows a thermally conductive adhesive which is applied onto a heat-conducting plate in an asymmetric fashion.

On the one hand, the thermally conductive adhesive (9) with which the energy storage cell (1) is attached to the heat-conducting plate (7) can be arranged asymmetrically on the heat-conducting plate. This is to be done such that the thermal conductivity provided by the adhesive (9) is higher in those areas in which the temperature storage cell (1) has a higher temperature according to the diagram of FIG. 7. In the exemplary embodiment illustrated in FIG. 8 the geometry of the adhesive surface is triangular. In this way, the upper part is cooled more strongly than the lower part and the central part is cooled more strongly than the left and right of the energy storage cell (1).

Figure 9:
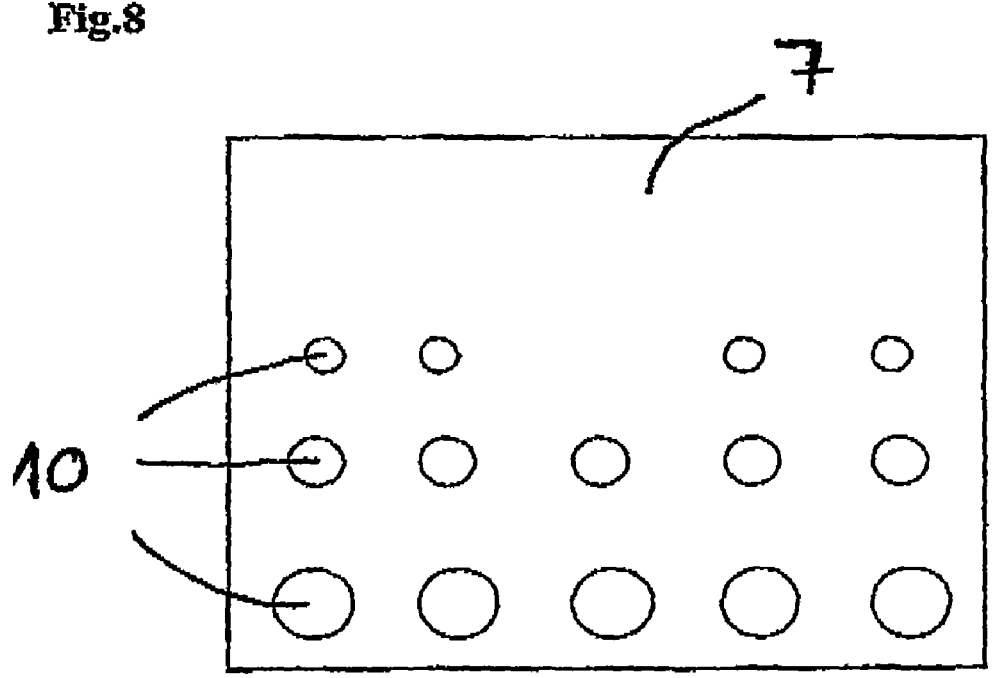
FIG. 9 shows a heat-conducting plate having recesses.

FIG. 9 shows an alternative embodiment. Here, the heat-conducting plate (7) to which the energy storage cell (1) is attached comprises recesses (10) in those areas in which the energy storage cell (1) must be cooled less strongly. These areas can also be identified in the diagram of FIG. 7.

FIG. 9 shows a combination of several features which such recesses (10) can advantageously have: the size of the recess can preferably vary, but a varying number of recesses is also conceivable. The recesses (10) of the heat-conducting plate (7) can be boreholes.

In the illustrated example, large boreholes are shown in the lower part, while the boreholes become smaller towards the top and there are no boreholes in the central area. A major advantage of this embodiment is the reduction in weight brought about by the recesses (10).

The invention claimed is:

1. An energy storage cell having a flexible envelope,
   wherein a flat surface of the energy storage cell is attached to a surface of a heat-conducting plate, and
   wherein the energy storage cell is attached to the heat-conducting plate by a thermally conductive adhesive joint which is arranged asymmetrically.

2. An energy storage cell according to claim 1, wherein the heat-conducting plate is thermally coupled to a temperature adjustment device for cooling the energy storage cell, heating the energy storage cell or both heating and cooling the energy storage cell.

3. An energy storage cell according to claim 1 further comprising a housing enclosing the energy storage cell and the heat-conducting plate, wherein the housing is composed of a material having a rigidity that is greater than a rigidity of the envelope of the energy storage cell.

4. An energy storage cell according to claim 1 further comprising a holder on the edge of the energy storage cell.

5. An energy storage cell according to claim 1, wherein the heat-conducting plate comprises an aluminium material.

6. An energy storage cell according to claim 1, wherein the surface of the heat-conducting plate is alloyed for increased rigidity.

7. An energy storage cell according to claim 1, wherein the surface of the heat-conducting plate is ribbed.

8. An energy storage cell according to claim 1, wherein the heat-conducting plate contains recesses.

9. An energy storage element comprising at least two energy storage cells according to claim 1, wherein the energy storage cells are attached to one side of a shared heat-conducting plate.

10. An energy storage element comprising at least three energy storage cells according to claim 1, wherein the energy storage cells are attached to one side or to both sides of a shared heat-conducting plate.

11. A device for cooling energy storage cells according to claim 1 further comprising a plurality of energy storing cells, wherein the energy storage cells are attached to at least one heat-conducting plate and the heat-conducting plate is thermally coupled to either at least one air cooler, at least one water cooler or at least one air cooler and at least one water cooler.

12. A device for heating energy storage cells according to claim 1 further comprising at least one energy storing cell, wherein the at least one energy storing cell is attached to at least one heat-conducting plate and the heat-conducting plate is thermally coupled to a temperature adjustment device which heats the at least one energy storing cell if temperatures are low.

* * * * *

UNITED STATES PATENT AND TRADEMARK OFFICE
CERTIFICATE OF CORRECTION

PATENT NO. : 8,343,648 B2  
APPLICATION NO. : 12/529753  
DATED : January 1, 2013  
INVENTOR(S) : Jens Unterdörfer et al.

Page 1 of 1

It is certified that error appears in the above-identified patent and that said Letters Patent is hereby corrected as shown below:

On the cover page, Item (75) inventor's name "Markjus Schweizer-Berberich" should be --Markus Schweizer-Berberich--.

Signed and Sealed this
Second Day of April, 2013

Teresa Stanek Rea
*Acting Director of the United States Patent and Trademark Office*